United States Patent [19]

Brischke

[11] Patent Number: 4,921,339
[45] Date of Patent: May 1, 1990

[54] DUAL MIRROR VIEWING SYSTEM

[76] Inventor: David S. Brischke, 3686 S Granby Way, Aurora, Colo. 80014

[21] Appl. No.: 396,093

[22] Filed: Aug. 21, 1989

[51] Int. Cl.⁵ .......................... G02B 5/08; G02B 5/10
[52] U.S. Cl. .................................. 350/623; 350/618; 350/619; 350/624; 350/544; 350/540
[58] Field of Search ............... 350/540, 543, 544, 617, 350/618, 619, 623, 624

[56] References Cited

U.S. PATENT DOCUMENTS

| 1,302,254 | 4/1919 | Warnecke | 350/618 |
| 1,352,841 | 9/1920 | Silver . | |
| 2,186,258 | 1/1940 | McDonald . | |
| 2,902,114 | 9/1959 | Ellithorpe . | |
| 4,605,291 | 8/1986 | Jolly | 350/618 |
| 4,613,216 | 9/1986 | Herbec et al. . | |
| 4,702,572 | 10/1987 | Cossey . | |
| 4,759,621 | 7/1988 | Hawkins | 350/623 |

Primary Examiner—Bruce Y. Arnold
Assistant Examiner—Jay Ryan
Attorney, Agent, or Firm—Jerry T. Kearns

[57] ABSTRACT

A dual mirror viewing system for providing an above ground exterior view through a below ground basement window surrounded by an exterior well, includes a pair of elongated extensible spaced frame members. A pair of elongated mirrors are mounted in inclined orientation at axially spaced locations between the frame members. Each of the mirrors is mounted by a bracket for axial, lateral, and angular adjustments. An upper one of the mirrors may have a convex surface for providing a wide angle view to basement occupants.

5 Claims, 3 Drawing Sheets

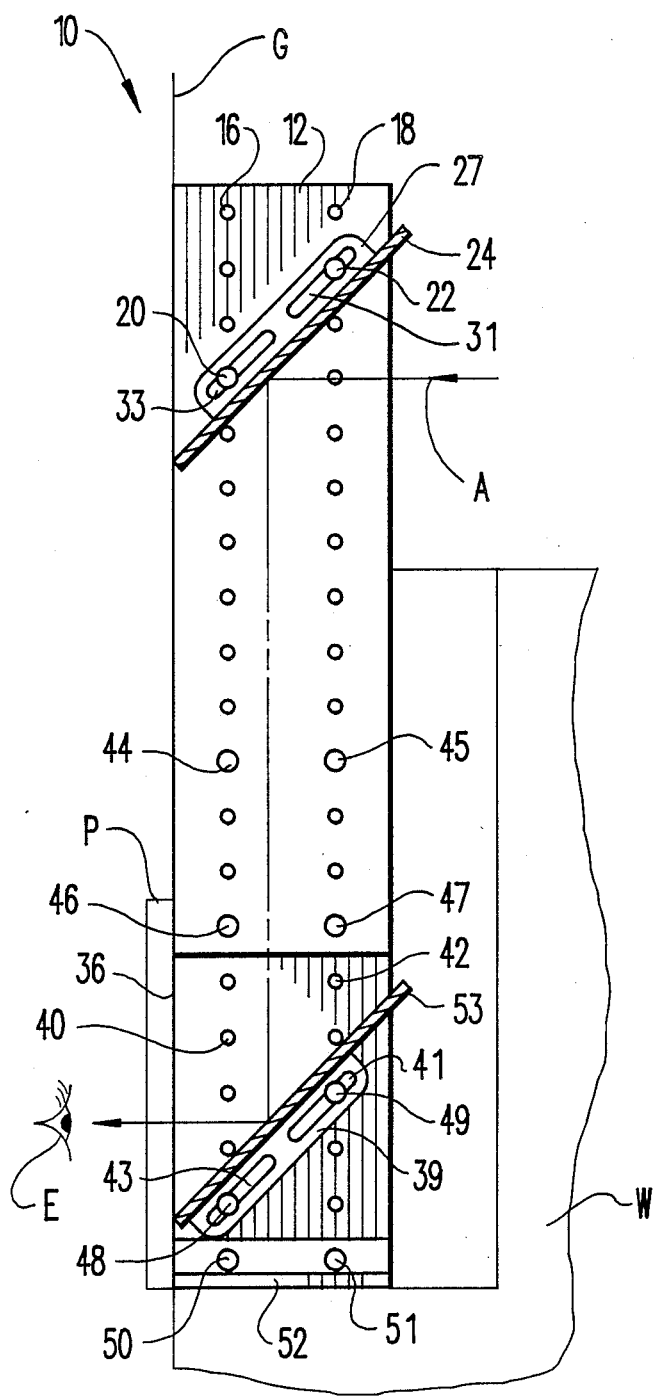
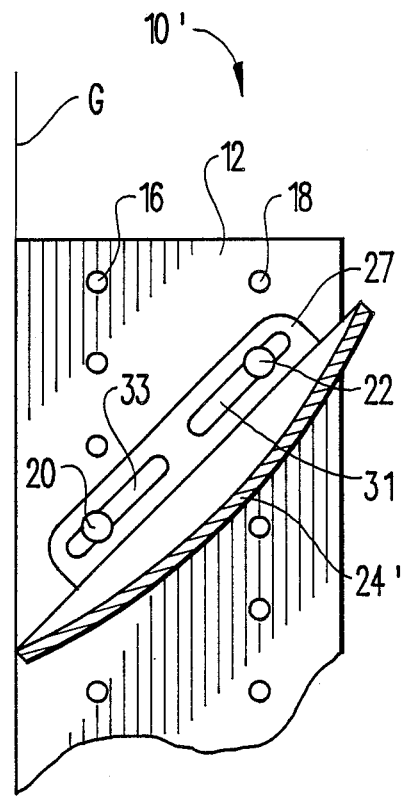
Fig. 3
Fig. 2

DUAL MIRROR VIEWING SYSTEM

BACKGROUND OF THE INVENTION

1. Field of the Invention

The present invention relates to dual mirror viewing systems, and more particularly pertains to a dual mirror viewing system which provides an above ground exterior view through a below ground basement window. Many homes and buildings are constructed with below ground basement windows surrounded by an exterior window well. The view conventionally afforded through these basement windows allows observation of only the unattractive window well. In order to overcome this problem, the present invention provides an adjustable dual mirror system which is adaptable for mounting in a varietY of differently dimensioned window wells to provide basement occupants of a building with a scenic above ground exterior view.

2. Description of the Prior Art

Various types of dual mirror viewing systems are known in the prior art. A typical example of such a dual mirror viewing system is to be found in U.S. Pat. No. 1,352,841, which issued to H. Silver on Sept. 14, 1920. This patent discloses a projection system which utilizes a telescoping tube enclosing vertically spaced inclined mirrors to provide visual communication between rooms located at different vertical elevations within a building. U.S. Pat. No. 2,186,258, which issued to E. McDonald on Jan. 9, 1940, discloses a mirror system for reflecting light from a vehicle headlights over the crest of a steep hill. U.S. Pat. No. 2,902,114, which issued to C. Ellithorpe on Sept. 1, 1959, discloses a dual mirror viewing system for allowing observation of an above ground bank service door by a below ground bank employee. U.S. Pat. No. 4,613,216, which issued to J. Herbec et al on Sept. 23, 1986, discloses a mirror system which allows viewing in either direction between vertically spaced locations. The device is designed for use in armored vehicles. U.S. Pat. No. 4,702,572, which issued to J. Cossey on Oct. 27, 1987, discloses a mirror system for viewing an infant in the rear seat of a vehicle utilizing a mirror mounted in the back seat of the vehicle which is adjustable so that it reflects the image of the infant to the rear view mirror for viewing by the vehicle driver.

While the above mentioned devices are directed to dual mirror viewing systems, none of these devices disclose a dual mirror viewing system having an adjustable frame which allows vertical, lateral, and angular adjustment of mirrors to provide an above ground view through a below ground basement window. Inasmuch as the art is relatively crowded with respect to these various types of dual mirror viewing systems, it can be appreciated that there is a continuing need for and interest in improvements to such dual mirror viewing systems, and in this respect, the present invention addresses this need and interest.

SUMMARY OF THE INVENTION

In view of the foregoing disadvantages inherent in the known types of dual mirror viewing systems now present in the prior art, the present invention provides an improved dual mirror viewing system. As such, the general purpose of the present invention, which will be described subsequentlY in greater detail, is to provide a new and improved dual mirror viewing system which has all the advantages of the prior art dual mirror viewing systems and none of the disadvantages.

To attain this, representative embodiments of the concepts of the present invention are illustrated in the drawings and make use of a dual mirror viewing system for providing an above ground exterior view through a below ground basement window surrounded by an exterior well, which includes a pair of elongated extensible spaced frame members. A pair of elongated mirrors are mounted in inclined orientation at axially spaced locations between the frame members. Each of the mirrors is mounted by a bracket for axial, lateral, and angular adjustments. An upper one of the mirrors may have a convex surface for providing a wide angle view to basement occupants.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purpoSes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dual mirror viewing system which has all the advantages of the prior art dual mirror viewing systems and none of the disadvantages.

It is another object of the present invention to provide a new and improved dual mirror viewing system which may be easily and efficiently manufactured and marketed.

It is a further object of the present invention to provide a new and improved dual mirror viewing system which is of a durable and reliable construction.

An even further object of the present invention is to provide a new and improved dual mirror viewing system which is susceptible of a low cost of manufacture with regard to both materials and labor, and which accordingly is then susceptible of low prices of sale to the consuming public, thereby making such dual mirror viewing systems economically available to the buying public.

Still yet another object of the present invention is to provide a new and improved dual mirror viewing system which provides in the apparatuses and methods of the prior art some of the advantages thereof, while simultaneously overcoming some of the disadvantages normally associated therewith.

Still another object of the present invention is to provide a new and improved dual mirror viewing system for providing a scenic above ground exterior view through a below ground basement window.

Yet another object of the present invention is to provide a new and improved dual mirror viewing system having an adjustable frame for mounting in a variety of differently dimensioned window wells.

Even still another object of the present invention is to provide a new and improved dual mirror viewing system which allows vertical, lateral, and angular adjustment of the mirrors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross sectional view, taken along line 2—2 of FIG. 1.

FIG. 3 is a cross sectional detail view, illustrating an optional viewing system in which a convex mirror is utilized to provide a wide angle view.

DESCRIPTION OF THE PREFERRED EMBODIMENT

Figure 1:
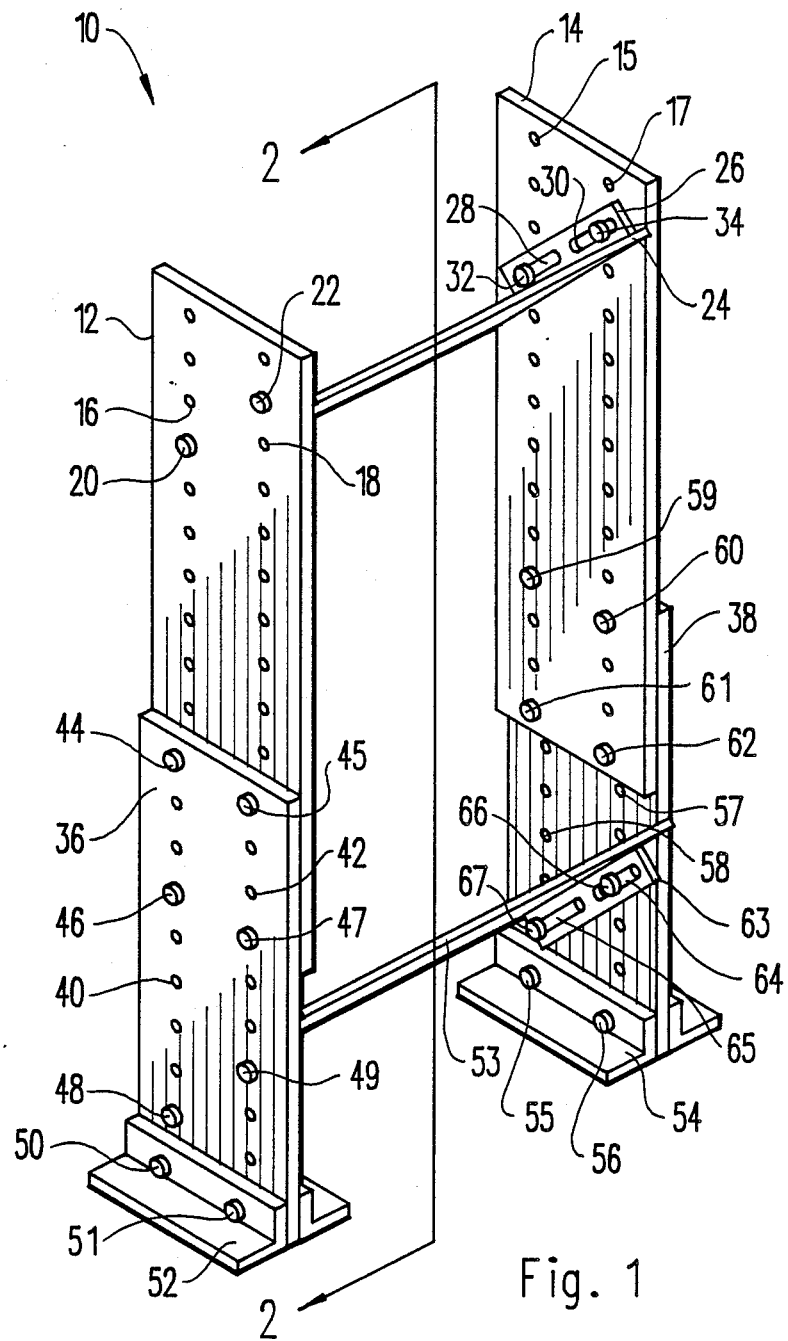
FIG. 1 is a perspective view of the dual mirror viewing system of the present invention.

With reference now to the drawings, and in particular to FIG. 1 thereof, a new and improved dual mirror viewing system embodying the principles and concepts of the present invention and generally designated by the reference numeral 10 will be described.

More specifically, it will be noted that the first embodiment 10 of the invention includes a frame formed by a pair of spaced generally parallel elongated extensible frame members. Each of the extensible frame members includes an elongated generally rectangular upper portion 12, 14 and an overlapping lower rectangular portion 36, 38. A pair of planar, generally rectangular mirrors 24 and 53 are mounted in an inclined orientation at axially spaced locations between the frame members. The mirror 24 includes a right angular flange bracket 26 having dual elongated slots 28 and 30 which receive threaded fasteners 32 and 34. The threaded fasteners extend through selected ones of a plurality of axially spaced apertures 15 and 17, which extend in laterally spaced columns. A similar arrangement is provided at the opposite end of the mirror 24. The mirror 53 includes a similar right angular flange bracket 63 having dual elongated slots 64 and 65 received in threaded fasteners 66 and 67 which are received through selected ones of a plurality of circular apertures 57 and 58, arranged in two laterally spaced columns. A foot member 54 is secured at a bottom end of the lower frame member 38 by threaded fasteners 55 and 56. A similar foot member 52 is secured by threaded fasteners 50 and 51 at the bottom end of the lower frame member 36. The upper frame member 12 is secured in overlapping adjusted relation with respect to the lower frame member 36 by a plurality of threaded fasteners 44, 45, 46 and 47. The lower frame member 36 is provided with a plurality of apertures 40 and 42 which are arranged in two laterally spaced vertical columns. Threaded fasteners 48 and 49 secure one end of the mirror 53 by a bracket arrangement similar to the bracket 63. Threaded fasteners 20 and 22 are provided for securement of the end of the mirror 24 to the upper frame members 12.

As shown in FIG. 2, the mirror system 10 is designed for mounting in a window well W surrounding a basement window glass pane P. The glass pane P lies in the exterior plane G of a building. As illustrated by the arrow A, the aligned inclined mirrors 24 and 53 provide an above ground exterior view to the eye E of a basement occupant. The mirrors 24 and 53 have facing optical reflective surfaces preferably oriented at a 45 degree angle with respect to a horizontal plane. The mirror 24 is mounted in a vertically adjusted position above the surface of the ground. Because the relative dimensions of the window well W, the window pane P and the level of the window below the ground surface vary between different buildings, the adjustable mounting of the mirrors allows adaptation to afford an optimal exterior view. The angle of the mirrors 24 and 53 may be independently adjusted by positioning the threaded fasteners in different apertures in the frame members 12 and 36. Additionally, the elongated slots 31, 33, 39, 43 allow for a lateral adjustment in an oblique through a sliding movement with respect to the threaded fasteners. The compound independent adjustability of the mirrors allow the selection of the most desirable viewing angles. Thus, the mirrors may be adjusted to provide a view of a scenic skyline, as desired. In addition to providing a scenic view, the dual mirror system may be utilized to provide a light source to a basement room. Depending upon the orientation of the basement window pane P, the mirrors 24 and 53 may be adjusted to afford a maximum amount of natural light during a selected time period of the day. Additionally, the mirrors may be seasonally adjusted to maintain an optimal degree of illumination.

FIG. 3 illustrates an alternative embodiment 10' in which the mirror 24' is provided with a convexly curved reflective optical surface to provide a wide angle view. It should be understood that either or both of the mirrors may be provided with an optically curved surface to provide various different views.

Figure 4:
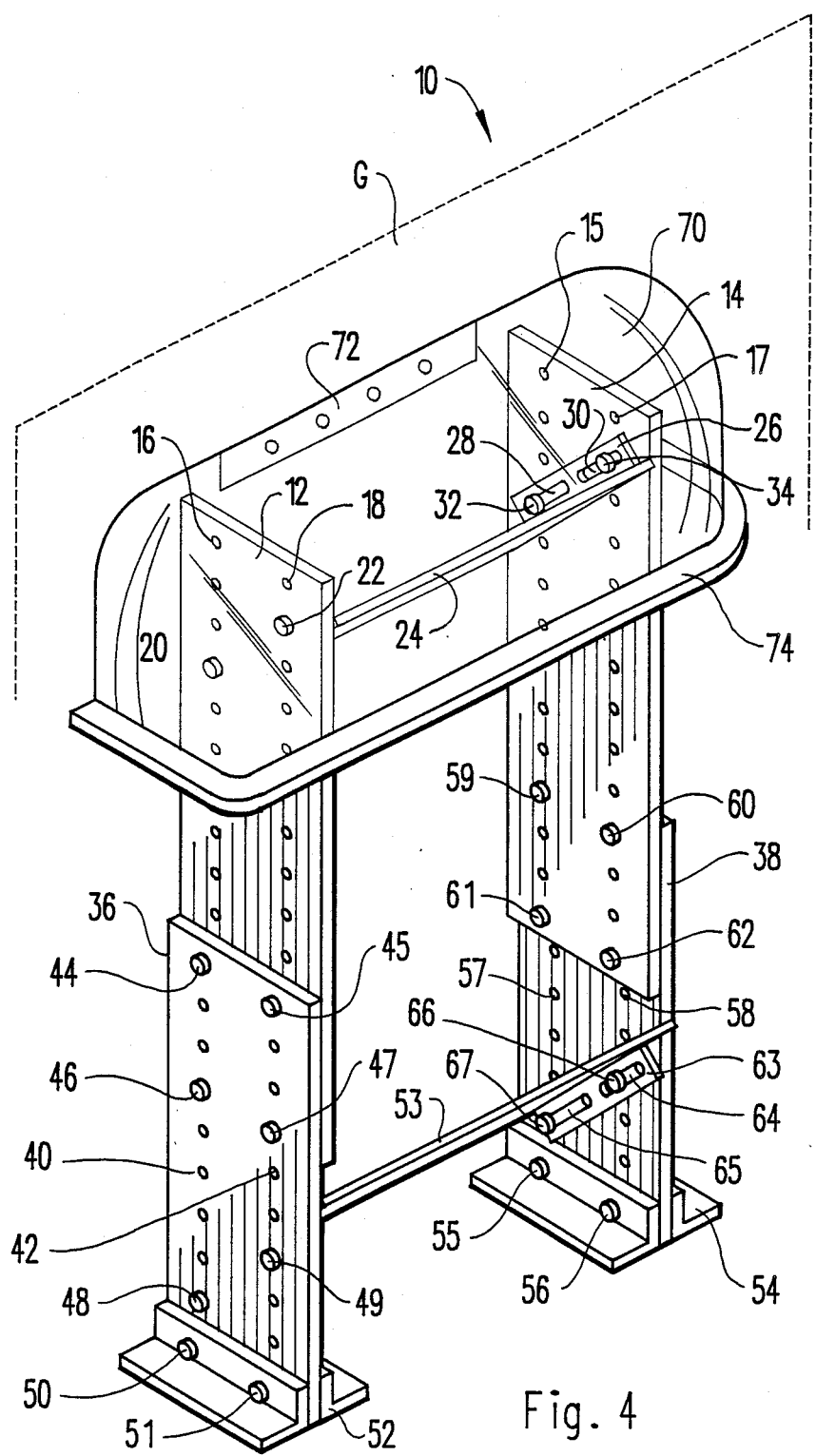
FIG. 4 is a perspective view illustrating the dual mirror viewing system of the present invention, with a transparent window well cover.

FIG. 4 is a perspective view which illustrates a transparent cover 70 including a peripheral flange 74 adapted for mounting over the peripheral rim of a conventional window well. The cover 70 includes a mounting tab 72 for securement to the exterior wall G of a building. The cover 70 prevents the mirrors 24 and 53 from being soiled by dust or rain.

As may now be understood, the present invention provides an extremely versatile dual mirror system which affords both a scenic above ground exterior view and natural lighting to below ground basement rooms.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dual mirror viewing system for providing an above ground exterior view through a below ground basement window surrounded by an exterior well, comprising:
   a pair of elongated extensible spaced frame members; each of said extensible frame members including a generally rectangular elongated lower member;
   a supporting foot on a bottom end of said lower member;
   a generally rectangular elongated upper member;
   a pair of laterally spaced columns of axially spaced apertures formed through each of said lower and upper members;
   a plurality of threaded fasteners received through selected apertures, securing said upper and lower members in overlapping adjusted positions;
   means for supporting said frame members in said exterior well, in alignment with said window;
   a pair of mirrors; and
   bracket means for adjustably securing said mirrors in axially spaced inclined orientation between said frame members.

2. The dual mirror viewing system of claim 1, wherein said bracket means comprises a pair of dual slotted flanged members secured at opposite ends of each of said mirrors; and
   a plurality of threaded fasteners extending through said flanged members and selected apertures for securing said mirrors in a selected adjusted orientation.

3. The dual mirror viewing system of claim 1, wherein each of said mirrors has a planar surface.

4. The dual mirror viewing system of claim 1, wherein one of said mirrors has a convex surface.

5. The dual mirror viewing system of claim 1, further comprising a transparent cover, and means for securing said cover over upper portions of said frame members.

* * * * *